United States Patent

Peschansky et al.

Patent Number: 5,698,851
Date of Patent: Dec. 16, 1997

[54] DEVICE AND METHOD FOR PRECISE ANGULAR MEASUREMENT BY MAPPING SMALL ROTATIONS INTO LARGE PHASE SHIFTS

[75] Inventors: Boris Peschansky, Rehovot; Lev Kraitman, Katzrin; Shimon Kraitman, Ness Ziona, all of Israel

[73] Assignee: Placa Ltd., Ness Ziona, Israel

[21] Appl. No.: 627,200

[22] Filed: Apr. 3, 1996

[51] Int. Cl.$^6$ .................... G01D 5/34; H01J 5/16
[52] U.S. Cl. .................... 250/231.16; 250/231.14
[58] Field of Search .................... 250/231.16, 231.14, 250/231.15, 231.17; 356/395; 33/706, 707

[56] References Cited

U.S. PATENT DOCUMENTS

| | | | |
|---|---|---|---|
| 4,604,521 | 8/1986 | Takekoshi et al. | 250/231.17 |
| 4,616,131 | 10/1986 | Burkhardt | 250/231.17 |
| 4,700,062 | 10/1987 | Ernst | 250/231.17 |
| 5,003,170 | 3/1991 | Masuda et al. | 250/231.17 |
| 5,414,516 | 5/1995 | Morishita et al. | 250/231.16 |

*Primary Examiner*—Edward P. Westin
*Assistant Examiner*—Kevin Pyo
*Attorney, Agent, or Firm*—Mark M. Friedman

[57] ABSTRACT

A device and method for measuring a precise angular position of an element rotatable relative to a base. The device includes a rotating disk having a first track and a second track, each track being made up of alternating lines of high and low transparency. The rotating disk is rotated continuously about the axis of rotation of the element. Aligned opposite the first track and parallel to the rotating disk is an optical grid, fixed relative to the base, having alternating lines of high and low transparency. A measuring disk attached to the element is aligned coaxially with the rotating disk. The device also features two photoelectric sensors and which generate signals corresponding to variations in measured optical transmissivity. One photoelectric sensor generates a reference signal corresponding to variations in optical transmissivity through a combination of the first track and the optical grid. The other photoelectric sensor generates a measurement signal corresponding to variations in optical transmissivity through a combination of the second track and the track of the measuring disk. These signals are then processed by a processor to calculate information relating to the precise angular position of the element relative to base.

15 Claims, 6 Drawing Sheets

DEVICE AND METHOD FOR PRECISE ANGULAR MEASUREMENT BY MAPPING SMALL ROTATIONS INTO LARGE PHASE SHIFTS

FIELD AND BACKGROUND OF THE INVENTION

The present invention relates to measurement systems in general and in particular to an apparatus for precise measurement of the angular position of a rotatable element.

It is known to use rotary encoders to convert rotation of a shaft into periodic electrical signals. These signals are then processed to derive position information for display or as an input to control systems. Typically, rotary encoders produce the electrical signals by photoelectric scanning of a graduated disk.

In high precision applications, i.e., where an angular resolution of ±1 or 2 seconds of arc or less is required, the use of rotary encoders becomes problematic. For such applications, graduated discs having 36,000 lines or more are used, giving a cumulative error of several arcseconds. An example of such a system employing additional reference marks to improve accuracy is disclosed in U.S. Pat. No. 4,477,189 to Ernst.

High precision encoders are generally unsuitable for use in calibration of existing rotary tables since the whole encoder assembly is constructed from a complex arrangement of extremely high precision components built into a highly rigid structure. The extremely high precision components are also highly expensive.

Calibration of high-precision rotary platforms or "rotary indexing tables" is typically performed using optical equipment such as a theodolite or a polygon collimator. Use of such equipment is extremely slow, generally requiring between 8 and 16 hours for set-up and calibration.

In order to reduce calibration time, an automated calibration system based on angular interferometry of laser light has been developed. Such a system, disclosed in U.S. Pat. No. 5,237,390 to Chaney, is available commercially as the RX10 system from Renishaw plc, U.K. However, even this very high-cost system typically requires 5–6 hours including the set-up time.

There is therefore a need for an alternative method for precise measurement of the angular position of a rotatable element such as a rotary table. It would also be highly advantageous to have a device which used low cost, relatively low-resolution components to make precise measurements of angular position.

SUMMARY OF THE INVENTION

The present invention is of a device and a method for measuring a precise angular position of an element rotatable relative to a base.

According to the teachings of the present invention there is provided, a method for precise measurement of an angular position of a rotatable element relative to a base, the method comprising the steps of: (a) generating, through rotation of a disk having at least one graduated track: (i) an oscillating reference signal, and (ii) an oscillating measurement signal, the measurement signal being related to the reference signal by a phase shift, the phase shift being a function of the angular position of the rotatable element relative to the base; and (b) measuring the phase shift, wherein a variation of $2\pi$ in the phase shift corresponds to a rotation step of less than about 1° of the rotatable element relative to the base.

According to a further feature of the present invention, the phase shift is measured in the range $0-2\pi$ thereby indicating the angular position within a rotation step, the method further comprising the step of counting zero crossings of the phase shift from a given starting value, the starting value corresponding to an initial angular position, such that the number of phase shift zero crossings indicates a rotation step within which the angular position lies.

According to a further feature of the present invention, there is also provided a step of identifying the state of the rotatable element as either rotating or stationary.

According to a further feature of the present invention, the phase shift is measured in the range $0-2\pi$ thereby indicating the angular position within a rotation step, the method further comprising the step of performing an approximate measurement of the angular position of the rotatable element relative to the base so as to determine a rotation step within which the angular position lies.

According to a further feature of the present invention, the reference signal is generated by measuring optical transmission through a combination of a fixed grid of alternating lines of high and low transparency and the at least one track on the rotating disk.

According to a further feature of the present invention, the measurement signal is generated by measuring optical transmission through a combination of a measuring track of alternating lines of high and low transparency associated with the element and the at least one track on the rotating disk.

There is also provided, according to the teachings of the present invention, a device for measuring a precise angular position of an element rotatable relative to a base, the device comprising: (a) a rotating disk having at least one primary track of alternating lines of high and low transparency, the rotating disk being rotated continuously about the axis of rotation of the element; (b) an optical grid of alternating lines of high and low transparency associated with one of the base and the element, the optical grid being positioned parallel to the rotating disk and opposite at least part of one the primary track; (c) a measuring disk associated with the other of the base and the element, the measuring disk being aligned coaxially with the rotating disk, the measuring disk having a secondary track of alternating lines of high and low transparency, the secondary track being aligned opposite at least part of one the primary track; (d) a first photoelectric sensor generating a reference signal indicative of variations in optical transmissivity through a combination of one the primary track and the optical grid; (e) a second photoelectric sensor generating a measuring signal indicative of variations in optical transmissivity through a combination of one the primary track and the secondary track; and (f) a processor for processing the reference signal and the measuring signal to calculate information relating to the precise angular position of the element relative to the base.

According to a further feature of the present invention, the processor includes: (a) at least one timer for measuring: (i) a period of a cycle of the reference signal, and (ii) a corresponding phase delay between the reference signal and the measuring signal; (b) a memory for storing a plurality of pairs of the period and the phase delay; and (c) a numerical processor for processing the plurality of pairs so as to calculate a precise representative phase difference.

According to a further feature of the present invention, the processor further includes a counter for counting zero crossings of phase difference between the reference signal and the measuring signal.

3

According to a further feature of the present invention, there is also provided a ball-and-socket joint associated with the base so as to accommodate a range of orientations of the rotatable element relative to the base.

There is also provided, according to the teachings of the present invention, a method for performing precise measurement of the angular position of an element rotatable relative to a base, the method comprising the steps of: (a) generating a first signal in relation to relative movement between the base and a rotating member, the first signal being approximately periodic; (b) generating a second signal in relation to relative movement between the element and the rotating member, the second signal being approximately periodic; (c) deriving from the first and second signals a plurality of data pairs ($T_i$, $t_i$), where $T_i$ is the period of a cycle of one of the first and second signals, and $t_i$ is the corresponding phase delay between the first and second signals; (d) processing the plurality of data pairs to identify a precise representative phase difference between the first and second signals; and (e) calculating from the representative phase difference information relating to the precise angular position of the rotatable element relative to the base.

According to a further feature of the present invention, the first signal is generated by sensing light transmitted through a combination of a graduated scale associated with the base and a graduated track associated with the rotating member.

According to a further feature of the present invention, the second signal is generated by sensing light transmitted through a combination of a first graduated track associated with the element and a second graduated track associated with the rotating member.

According to a further feature of the present invention, the first and second signals include about 3600 cycles for each rotation of the rotating member.

According to a further feature of the present invention, the step of deriving a plurality of data pairs ($T_i$, $t_i$) includes deriving the data pair for consecutive cycles of the first or second signal for N cycles, where N is equal to the number of cycles generated by each rotation of the rotating member.

BRIEF DESCRIPTION OF THE DRAWINGS

The invention is herein described, by way of example only, with reference to the accompanying drawings, wherein.

4

DESCRIPTION OF THE PREFERRED EMBODIMENTS

The present invention is of a device and a method for measuring a precise angular position of an element rotatable relative to a base.

The principles and operation of devices and methods according to the present invention may be better understood with reference to the drawings and the accompanying description.

Figure 1:
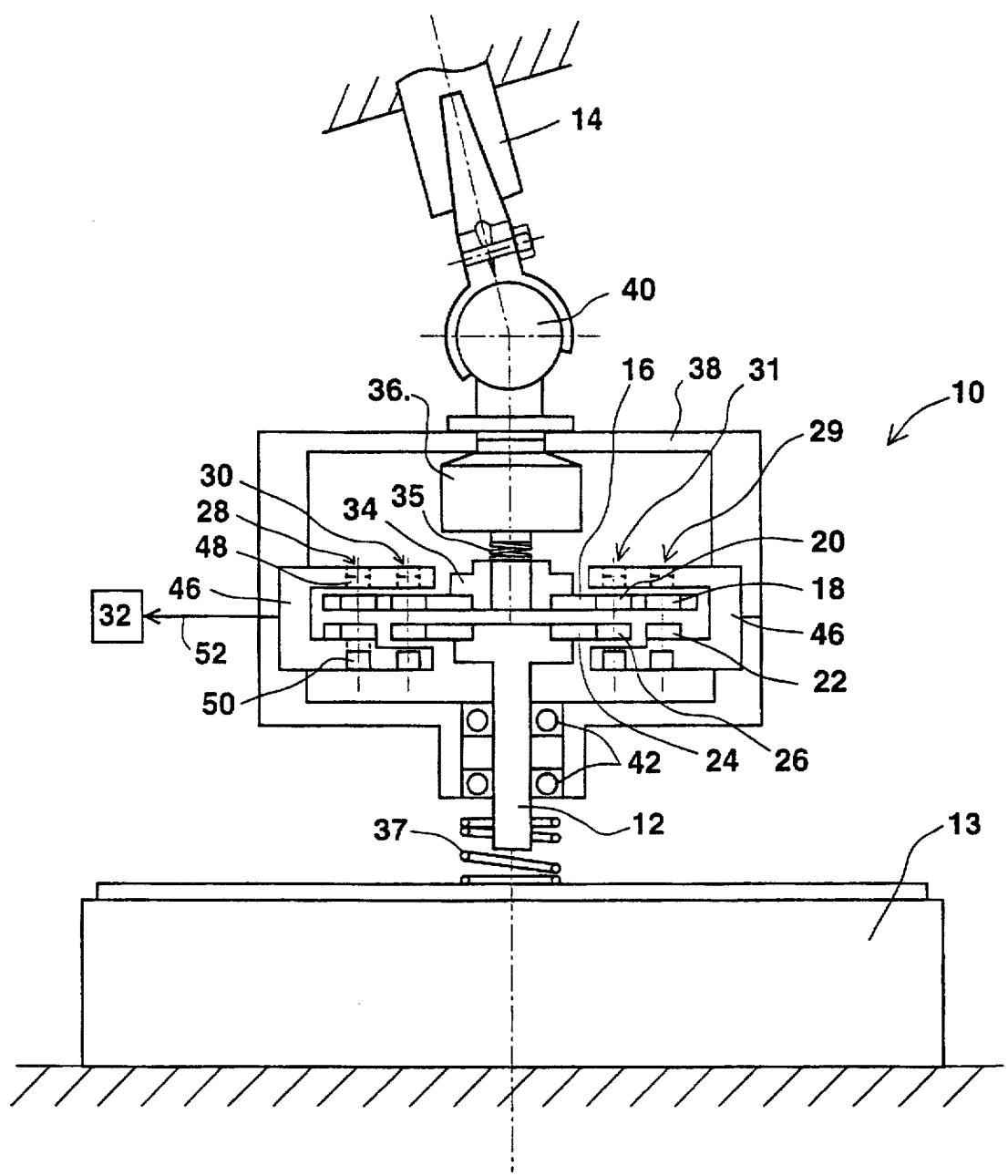
FIG. 1 is a side cross-sectional view of a device, constructed and operative according to the teachings of the present invention, for measuring a precise angular position of an element rotatable relative to a base.
Figure 2:
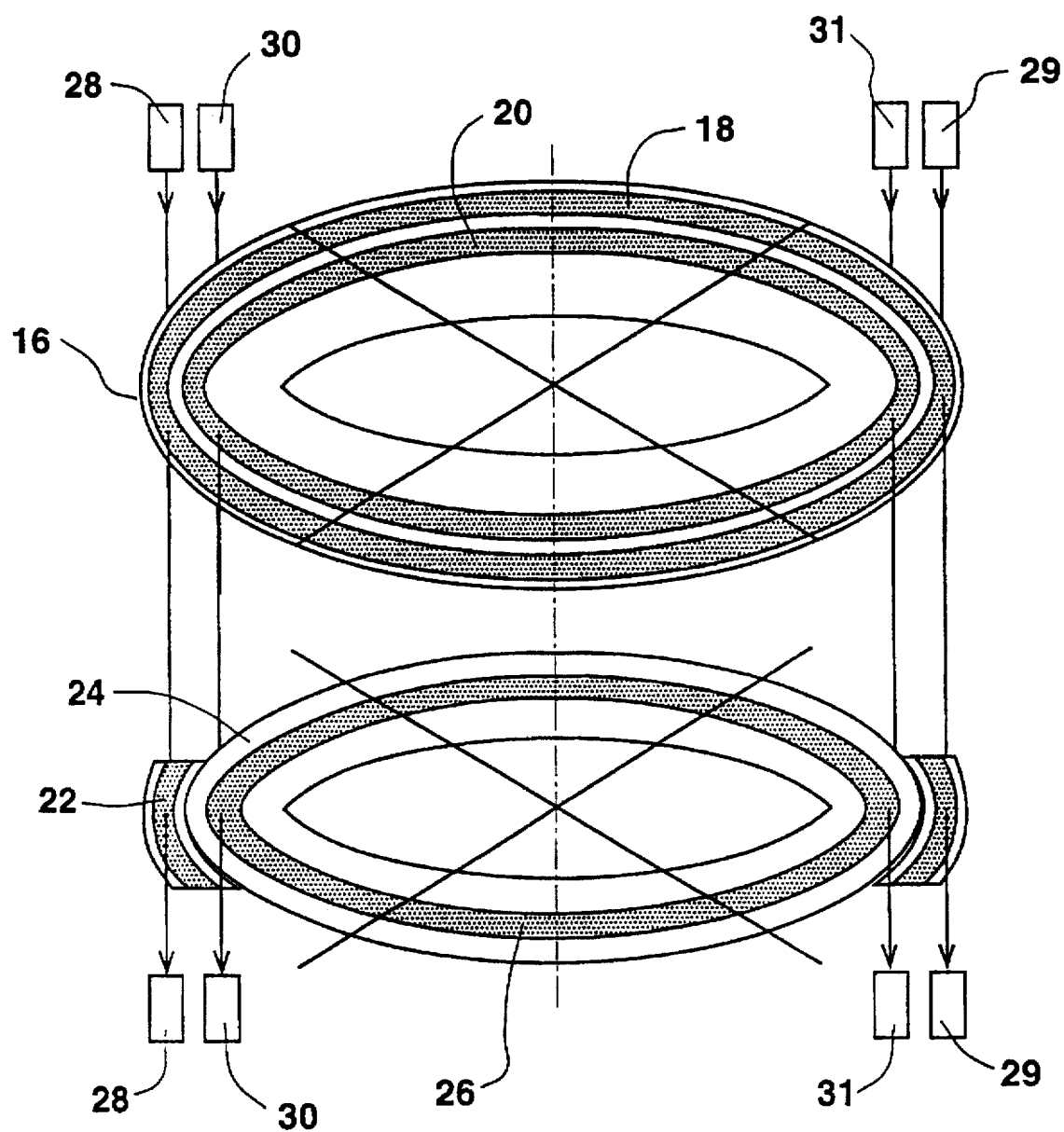
FIG. 2 is a schematic exploded perspective view showing the alignment of components of the device of FIG. 1.

Referring now to the drawings, FIG. 1 shows a device, generally designated 10, constructed and operative according to the teachings of the present invention, for measuring a precise angular position of a shaft 12 coupled to a rotary table 13 relative to a base 14. FIG. 2 shows, schematically, the alignment of certain components of device 10.

Generally speaking, device 10 includes a rotating disk 16 having a first track 18 and a second track 20. Each track 18, 20 is made up of alternating lines of high and low transparency, typically with a sinusoidal variation of transmissivity. Rotating disk 16 is rotated continuously about the axis of rotation of shaft 12. Aligned opposite first track 18 and parallel to rotating disk 16 are two optical grids 22, each having alternating lines of high and low transparency. Grids 22 are fixed relative to base 14, typically on opposite sides of the axis of rotation of shaft 12. A measuring disk 24, attached to shaft 12, is aligned coaxially with rotating disk 16. Measuring disk 24 has a track 26 of alternating lines of high and low transparency, aligned opposite second track 20.

Device 10 also features photoelectric sensors 28 and 30 which generate signals corresponding to variations in measured optical transmissivity. Photoelectric sensors 28 generate a reference signal corresponding to variations in optical transmissivity through a combination of first track 18 and optical grid 22. Photoelectric sensors 30 generate a measurement signal corresponding to variations in optical transmissivity through a combination of second track 20 and track 26. These signals are then processed by a processor 32 to calculate information relating to the precise angular position of shaft 12 relative to base 14.

It should be noted that the arrangement of device 10 in relation to shaft 12 and base 14 is arbitrary. Hence, device 10 may readily be reversed such that measuring disk 24 is fixed to base 14, and optical grids 22 are attached shaft 12, without altering the functionality of device 10. Similarly, since only relative rotation between shaft 12 and base 14 is to be measured, it is immaterial whether device 10 is arranged to measure rotation of shaft 12 relative to base 14, or of base 14 relative to shaft 12.

Device 10 provides a major improvement over the prior art calibration systems by allowing highly precise angular measurement of 360 positions within a total time of 20–30 minutes, including set-up time. Device 10 also utilizes relatively low-precision components, thereby offering considerable cost savings over the prior art systems.

Turning now to the features of device 10 in more detail, rotating disk 16 and measuring disk 24 are typically made from similar materials, and produced by similar techniques, to those used for optical disks in conventional encoders. Typically, rotating disk 16 has a diameter of about 50 mm. Rotating disk 16 and measuring disk 24 are preferably mounted sufficiently close to prevent significant transmission of diffracted light. Typically the spacing between them is of the order of 0.1 mm.

First track 18 and second track 20 of rotating disk 16 feature equal numbers of radial lines at a constant angular spacing. The lines of tracks 18 and 20 are in phase with each other, i.e., each line of first track 18 is collinear with one line of second track 20. In fact, depending on design considerations, tracks 18 and 20 may be implemented as a single broad track.

First track 18 and second track 20 typically feature between about 1000 and about 10000 lines. Preferably, a value of about 3600 lines, i.e., an angular spacing of 0.1°, is sufficient to provide very high accuracy without requiring highly expensive production techniques. The lines are preferably opaque, or near-opaque, lines on a relatively transparent background, and are preferably sufficiently broad to cover about 50% of the functional area of each track. However, any arrangement of equally spaced radially-extending regions of relatively higher transparency alternating with equally spaced radially-extending regions of relatively lower transparency will be functional. Thus, the various options for the pattern of regions in tracks 18 and 20 will be referred to herein generally as alternating lines of high and low transparency.

Rotating disk 16 is mounted on a rotating hub 34 which is driven continuously through a flexible coupling 35 by a motor 36. Motor 36 is preferably of a type which does not produce significant vibration. Coupling 35 prevents slight eccentricity of motor 36 from effecting alignment of rotating disk 16. The speed of rotation of motor 36 is not critical, but should be significantly greater than the anticipated speed of rotation of rotary table 13. Motor 36 is attached to a casing 38 which provides a rigid structure and protective cover for device 10.

For the purposes of calibrating an existing rotary table 13, base 14 must be fixed to some rigid structure which provides a fixed relation to the basis of rotor table 13. In the implementation shown here, one side of casing 38 is attached to base 14 though a ball-and-socket joint 40, and shaft 12 is rotatably mounted through bearings 42 in the opposite side of casing 38. This configuration allows convenient accommodation of different positions or attitudes of base 14 relative to rotary table 13 without interfering with operation of device 10. An additional flexible coupling 37 is provided between shaft 12 and rotary table 13 thereby making device 10 less sensitive to eccentric mounting of shaft 12 relative to rotary table 13.

Measuring disk 24 is mounted near the end of shaft 12 parallel to rotating disk 16 and in a common plane with optical grids 22. Measuring disk 24 is generally equivalent to rotating disk 16 cut down such that its radius lies between that of first track 18 and second track 20. Track 26 features a number of lines equal to that of tracks 18 and 20. The lines of track 26 are preferably opaque, or near-opaque, lines on a relatively transparent background, and are preferably sufficiently broad to provide about 50% coverage of the operative area of track 26.

One of optical grids 22 and one of each of photoelectric sensors 28 and 30 are typically set in a U-shaped bracket 46 attached to the inside of casing 38 such that it extends over the faces of rotating disk 16 and measuring disk 24. In a basic embodiment of the present invention, a single U-shaped bracket 46, with a single set of one of optical grids 22 and one of each of photoelectric sensors 28 and 30, would be sufficient. Preferably, however, two such assemblies are provided opposite to each other, i.e., one rotated from the other by 180° around the axis of rotation of shaft 12. The second pair of photoelectric sensors are designated, respectively, 29 and 31. The outputs from the two assemblies are processed by processor 32 to reduce the effects of cumulative error and shaft eccentricity. The details of this processing will be described below.

Optical grids 22 are typically equivalent to a small section of first track 18 with its lines aligned towards the axis of rotation of shaft 12, i.e., "radially". The lines of optical grids 22 are "angularly spaced" at the same angular spacing as the lines of tracks 18, 20 and 26 relative to the axis of rotation of shaft 12. However, since the area of optical grids 22 is generally small in relation to the diameter of first track 18, the required pattern may be adequately approximated by a similar grid of equidistant parallel lines.

Photoelectric sensors 28 and 30 each include a light emitter 48, such as, for example, an infrared LED or a bulb, and a light sensor 50 of any conventional type, such as, for example, a photodiode or phototransistor. A single light emitter 48 may be common to adjacent photoelectric sensors 28 and 30.

The two parts of photoelectric sensor 28 are in fixed alignment with optical grid 22 and aligned in a manner such that a beam of light from light emitter 48 passes through both optical grid 22 and first track 18 before reaching light sensor 50. Photoelectric sensor 28 thus produces an output signal, referred to herein as the "reference signal", corresponding to the transmissivity of the superposition of optical grid 22 and first track 18 at any given instant. As will be explained below, this reference signal is an oscillating signal. The output signals are typically of approximately sinusoidal form.

The two parts of photoelectric sensor 30 are aligned in a manner such that light from light emitter 48 passes through both second track 20 and track 26 of measuring disk 24 before reaching light sensor 50. Photoelectric sensor 30 thus produces an output signal, referred to herein as the "measuring signal", corresponding to the transmissivity of the superposition of track 26 and second track 20 at any given instant. This measuring signal is also an oscillating signal, differing only in phase from the reference signal, as will be explained below.

The reference and measuring signals are transferred through electrical connections 52 to processor 32. The details of processor 32 will be described below with reference to FIGS. 6–7.

Figure 3A:
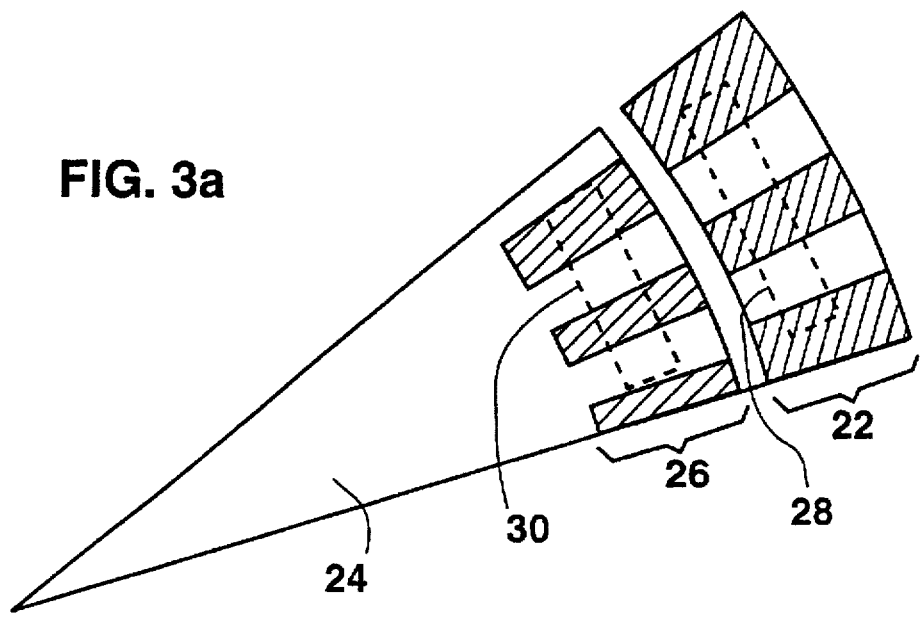
FIG. 3A is a schematic plan view of a part of a measuring disk and an optical grid from the device of FIG. 1.
Figure 3B:
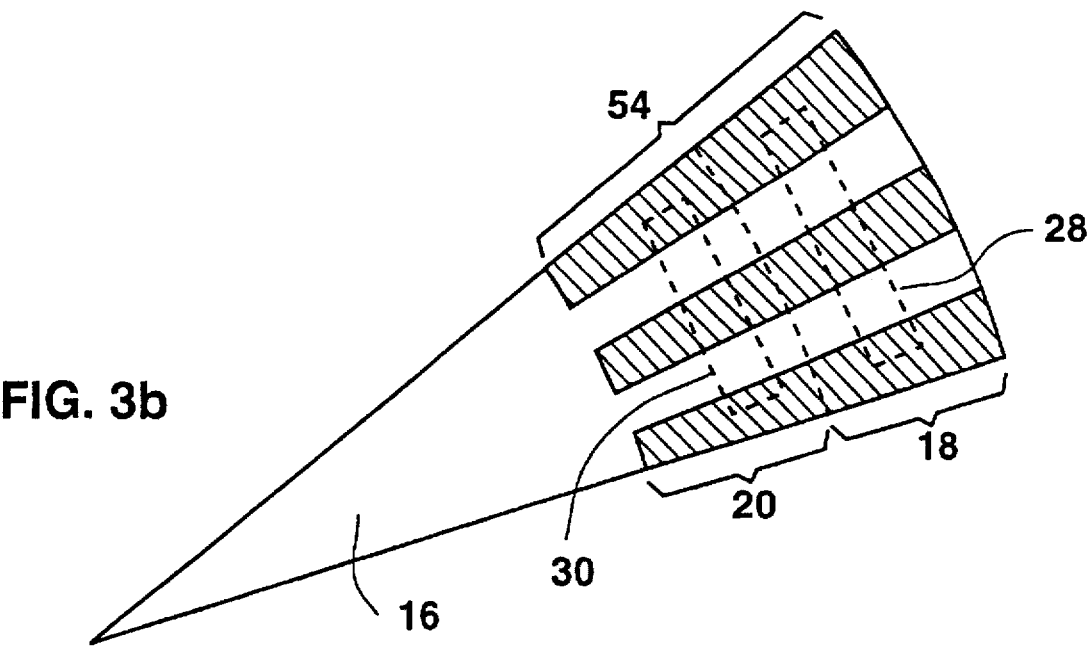
FIG. 3B is a schematic plan view of a part of a rotating disk from the device of FIG. 1.

Turning now to the operation of device 10, this will be described with reference to FIGS. 3–5. FIG. 3A shows, schematically, a portion of measuring disk 24 with track 26, and optical grid 22. In this example, measuring disk 24 is in a rotational position such that the lines of track 26 are out of alignment with the lines of optical grid 22 by about a quarter of the angular separation between the lines. FIG. 3B shows, schematically, a portion of rotating disk 16 with first track 18 and second track 20, here broadened to form a single broad track 54. In both FIGS. 3A and 3B, the operative areas of photoelectric sensors 28 and 30 are indicated by dashed lines.

Figure 4:
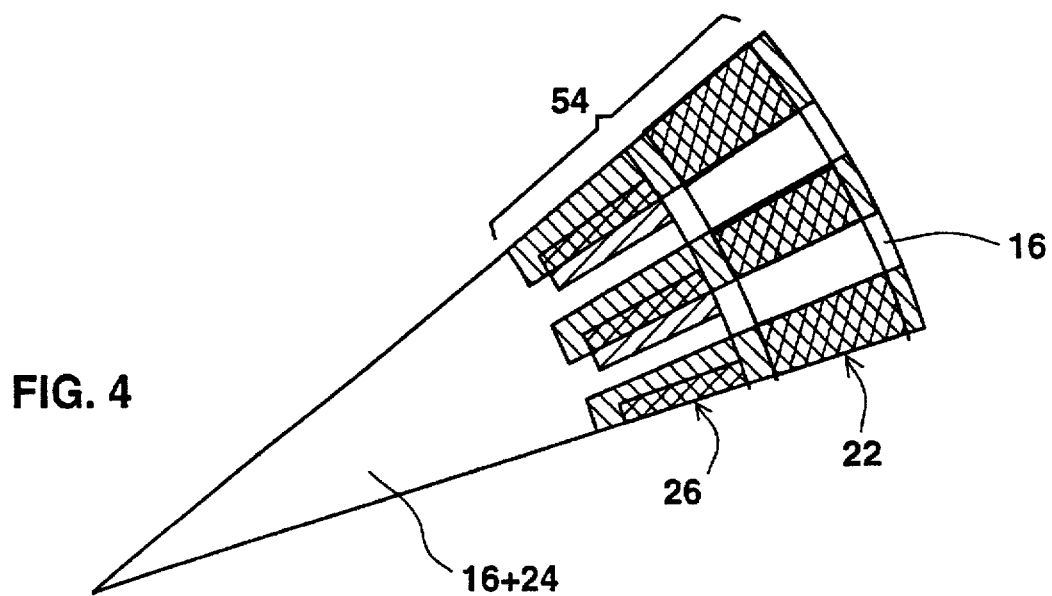
FIG. 4 is a schematic plan view showing the rotating disk of FIG. 3B superposed over the measuring disk and optical grid of FIG. 3A.

FIG. 4 illustrates the effect of superposing rotating disk 16 as shown in FIG. 3B over measuring disk 24 and optical grid 22 as shown in FIG. 3A. The rotation of rotating disk 16 causes the lines of tracks 18 and 20 to pass over the lines of optical grid 22 and track 26, respectively, thereby producing a cyclic variation of the amount of overlap of lines of low transparency over the operative areas of photoelectric sensors 28 and 30. This, in turn, causes cyclic variation of the transmission measured by photoelectric sensors 28 and 30, generating oscillating output signals.

Figure 5:
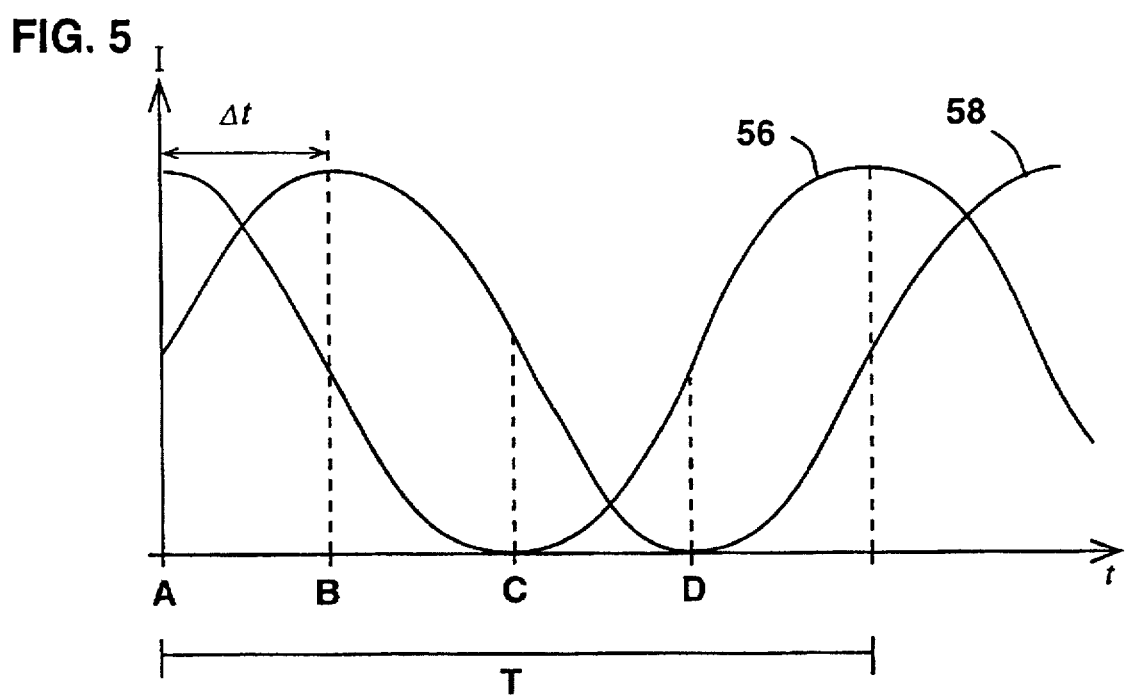
FIG. 5 is a graph showing the variation of transmitted light intensity with time for a reference signal and a measuring signal generated by photoelectric sensors in the device of FIG. 1.

FIG. 5 shows the variations in the reference signal, designated 56, produced by photoelectric sensor 28, and in the measuring signal, designated 58, produced by photoelectric sensor 30. The values corresponding to successive positions of rotating disk 16 are denoted by capitals A–D. The period of the oscillations measured, for example, from peak to peak is denoted T. The time lag of measuring signal 58 after reference signal 56 is denoted At. A normalized phase shift A+ between the signals is then defined by:

$$\Delta\phi = 2\pi \Delta t/T \quad (1)$$

It will readily be appreciated that calculation of the normalized phase shift $\Delta\phi$ determines extremely accurately the angular position of measuring disk 24 relative to optical grid 22, and hence of shaft 12 and rotary table 13 relative to base 14, within a certain rotation step. Expressed algebraically, if measuring track 26 has a total of N lines so that the angular step between them is given by $\Delta\theta=360°/N$, the angular position $\theta$ of rotary table 13 relative to base 14 measured from some arbitrary initialization position may be written as:

$$\theta = n\Delta\theta + \Delta\phi\Delta\theta/2\pi \quad (2)$$

where n is an integer. In other words, if, by way of example, track 26 and optical grid 22 are ruled with lines at an angular spacing of $\Delta\theta=0.1°$ (N=3600 lines per rotation), phase shift $\Delta\phi/2\pi$ corresponds to the angular position of rotary table 13 within a 0.1° step, expressed as a fraction. Thus, device 10 transforms a rotation of 0.1° to a phase shift of $2\pi$, thereby providing much higher accuracy of angular measurement than is conventionally achieved using components of a given angular spacing or resolution.

In principle, a single measurement of phase shift is sufficient to determine the angular position of rotary table 13 within a given rotation step, and the only additional information required is low-resolution information to determine within which rotation step the rotary table currently lies. However, it is a particular feature of a preferred embodiment of the present invention that extremely accurate measurement of angular position may be taken using low precision components. This is achieved by collecting large amounts of data in a manner such as to minimize systematic errors and then performing statistical analysis on the data, as will now be described with reference to FIGS. 6–7.

Figure 6:
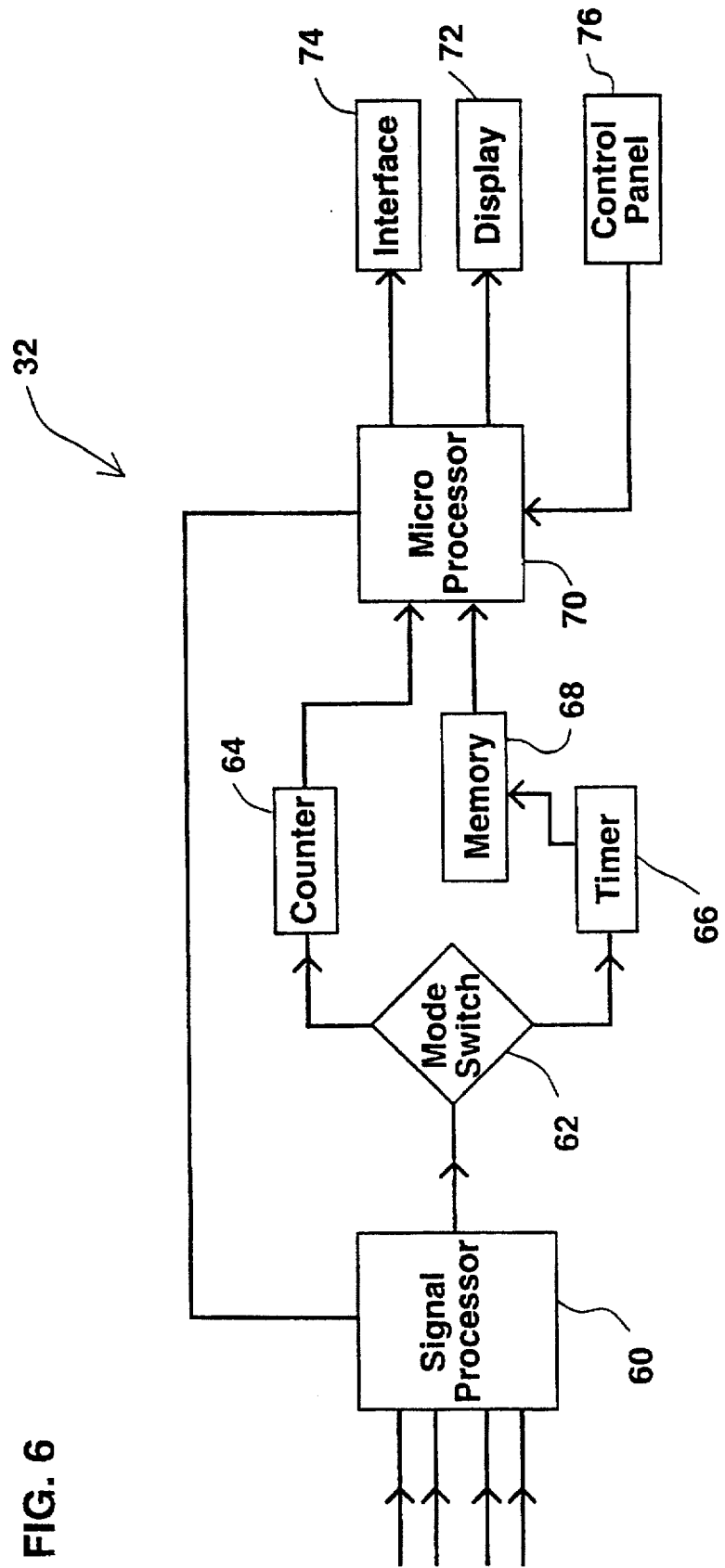
FIG. 6 is a block diagram of a processor for use in the device of FIG. 1.

FIG. 6 shows a possible structure of processor 32. Processor 32 typically includes a signal processor 60, a mode switch 62, a zero-crossing counter 64, a timer 66, a memory 68 and a microprocessor 70. Processor 32 typically also includes a display 72, a standard computer communications port 74 and a control panel or other input device 76.

Signal processor 60 receives a pair of reference and measuring signals through electrical connections 52. Signal processor 60 generally converts the oscillatory reference and measuring signals to a pulse or square-wave form to allow use of digital processing techniques. For convenience, these wave forms will be referred to collectively as "pulse signal". Devices and methods for performing this signal processing are well known in the art. In a preferred embodiment in which two photoelectric sensor assemblies are used, signal processor 60 receives a pair of signals from each assembly, i.e., a total of four signals. In this case, signal processor also includes a switching system operative under the control of microprocessor 70 to select one pair of inputs. Typically, one pair of inputs remains in use continuously except for a short period when precise angular measurement is being made, as will be described below.

From signal processor 60, two pulse signals corresponding to a pair of reference and measuring signals are transferred to mode switch 62. Mode switch 62 sets the mode of processor 32 according to the state of shaft 12 as either rotating or stationary. Preferably, mode switch 62 is automatic, functioning by identifying significant shifts in phase between the two signals. The sensitivity of mode switch 62 is set so as to disregard variations which are within the range of tolerance of the components used. When shaft 12 is rotating, mode switch 62 switches to pass the signals to phase shift zero-crossing counter 64 for coarse measurement of angular position. When shaft 12 is stationary, mode switch 62 switches to pass the signals to timer 66 for precise measurement of angular position. Signal processor 60, may provide somewhat different signal forms for of zero-crossing counter 64 and timer 66 as appropriate for the processing to be performed by each. Alternatively, mode switch 62 may be replaced by any other type of movement sensor or a simple manual switch operated by a user when precise measurement is required.

Phase shift zero-crossing counter 64 maintains a cumulative count of zero crossings of the phase shift between the reference signal and the measuring signal. By way of example only, this may be done simply by counting pulses, i.e., adding one to a counter for each signal pulse which arrives and subtracting one for each reference pulse. The number reached then corresponds to the number of rotation steps moved through by shaft 12 relative to base 14 from some given initialization position. This number is passed on to microprocessor 70 for use in determining the overall angular position of rotary table 13.

Turning now to timer 66, this functions to derive a plurality of data pairs $(T_i, t_i)$ from the pulse signals corresponding to the reference and measuring signals. Within each data pair, $T_i$ is the period of a cycle of the reference signal, i.e., the time between adjacent pulses or wave-fronts, and $t_i$ is the corresponding phase delay of the measuring signal relative to the reference signal, i.e., the time between the first of the adjacent pulses of the reference signal and the measuring signal pulse which follows it.

Figure 7:
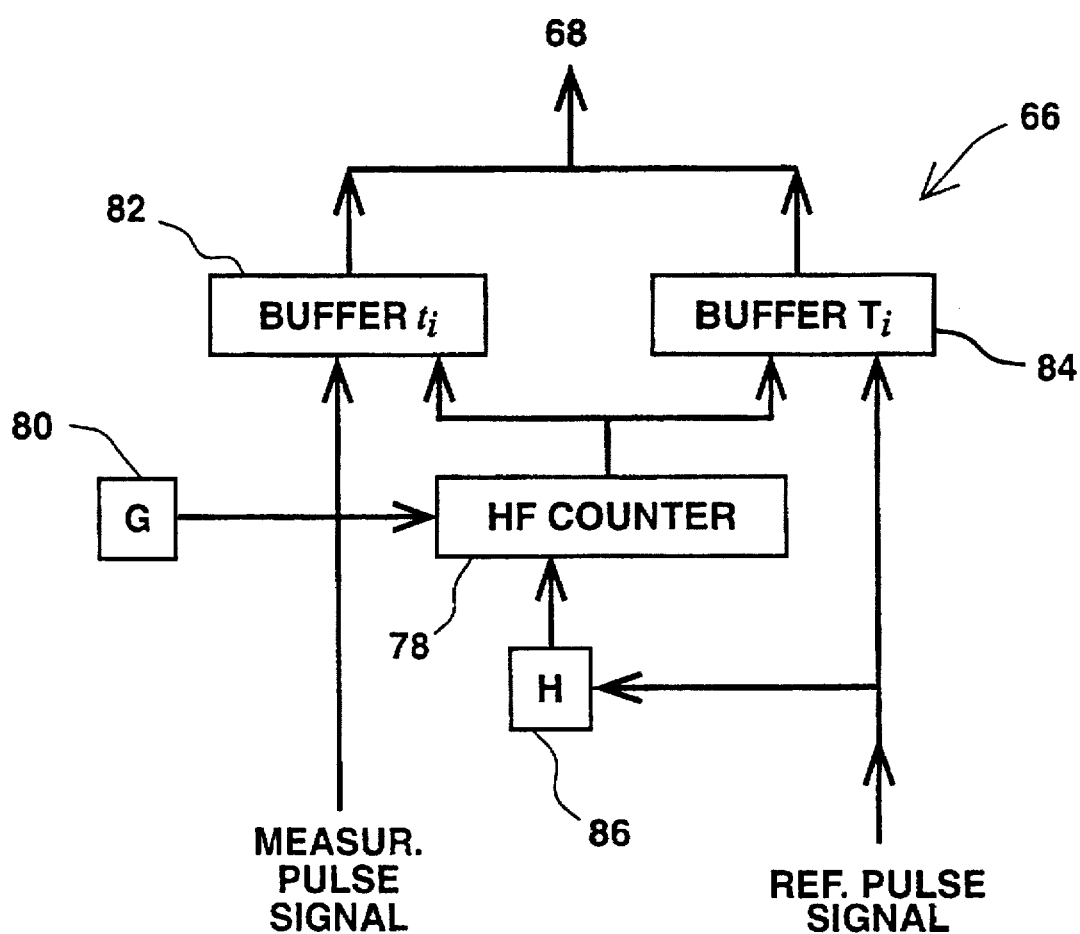
FIG. 7 is a detailed block diagram of an example of a timer for use in the processor of FIG. 6.

An example of a structure for timer 66 is shown in FIG. 7. Thus, according to this example, timer 66 features a high-frequency counter 78 driven by a high frequency generator 80. Typically, generator 80 operates at a frequency of some tens of MHz, and preferably about 45 MHz. Counter 78 is typically a two-byte counter, but a larger counter may be used if required. A first buffer 82 is provided for measuring $t_i$ and a second buffer 84 is provided for measuring $T_i$.

Arrival of a pulse from the signal corresponding to the reference signal causes writing of the value from counter 78 to second buffer 84 and then, after a very short delay caused by delay 86, resetting of counter 78. The delay is solely for the purpose of allowing reading of the counter before resetting and is of the order of a nanosecond, thereby having no measurable effect on the precision of the device. When a pulse from the signal corresponding to the measuring signal arrives, it causes writing of the value from counter 78 to first buffer 82, thereby recording $t_i$, the number of generator cycles corresponding to the phase delay between the reference and measuring signals. Arrival of the subsequent reference signal pulse causes writing to second buffer 84 of the corresponding $T_i$, the number of generator cycles corresponding to the period of the reference signal within which ti was measured. Counter 78 is then reset in preparation to measure the next data pair $(T_{i+1}, t_{i+1})$ while $(T_i, t_i)$ is stored in memory 68.

Microprocessor 70 then processes the data pairs stored in memory 68 to identify a precise representative phase difference between the reference signal and the measuring signal. This is typically done by calculating the normalized phase difference:

$$\Delta\phi_i = 2\pi t_i/T_i$$

and then using standard statistical methods to determine a precise representative value. This value may be a simple mean value, or may be determined by more complex methods. In particular, it is valuable to check for ranges of measured phase differences which overlap a zero-crossing. In such a case, a correction factor of ±2π must be added to certain phase measurements to form a single contiguous range of data before statistical analysis is performed. A corresponding correction of ±1 to the figure from counter 64 may be required. This allows accurate measurement in any angular position over a continuous range of 360°.

Parenthetically, it is of interest to note that, since the quantity of interest is the normalized or relative phase difference, i.e., the ratio of $t_i$ to $T_i$, the period of the oscillations T may vary without affecting the accuracy of measurements. Thus, as mentioned above, neither the particular speed of rotation of motor 36, nor its constancy, is critical.

Based on the precise representative phase difference together with the reading from zero-crossing counter 64, microprocessor 70 can then calculate a uniquely determined and highly accurate rotational position of rotary table 13 relative to base 14. This information may be displayed on display 72 and/or transferred directly to other equipment via communications port or interface 74. Control panel 76 may be used to control the mode of operation of the device as a whole, the format of the display, and any other parameters of the system which may be user-definable.

Turning now to the operation of processor 32, as mentioned earlier, signal processor generally remains switched to a primary pair of reference and measured signals. As long as mode switch 62 indicates that shaft 12 is rotating, counter 64 tracks coarse movement of shaft 12 to determine within which rotational step it lies while timer 66 and memory 68 are by-passed. When shaft 12 stops, timer 66 starts automatically, or under control from control panel 76 via microprocessor 70, to take measurements of ($T_i$, $t_i$) data pairs. This data is then accumulated in memory 68.

It is a particular feature of a preferred embodiment of the present invention that processor 32 accumulates data pairs from consecutive cycles of the reference or measuring signals corresponding to a full rotation of rotating disk 16. This enables much more precise measurement than would otherwise be possible with components of a given tolerance since any systematic errors caused by irregularities of the disk tend to cancel out. Each data pair is used to calculate a position measurement and statistical analysis is performed on the results.

As a further technique for reducing systematic errors, after collection of data pairs corresponding to a rotation of rotating disk 16 using signals from one set of photoelectric sensors, microprocessor 70 actuates temporary switching of signal processor 60 to the signals from the second set of photoelectric sensors. Memory 68 then accumulates an additional set of data pairs corresponding to substantially a full rotation of rotating disk 16. In this way, processor 32 utilizes 2N data pairs where N is the number of lines on each graduated disk. The total time for measurement and processing at each position is typically a few seconds corresponding to an almost-real-time measurement system.

If required, the measuring cycle may be repeated one or more times, thereby providing multiples of 2N (2kN: k=1, 2,3 . . . ). Since this corresponds to a very large number of measurements taken in a manner minimizing systematic errors, statistical analysis yields a very high degree of precision.

In a preferred example in which rotating disk 16 features about 3600 lines per rotation, use of a single full set of data pairs from each set of photoelectric sensors yields 7200 data pairs. Analysis of this data provides angular precision of better than ½ arcsecond, thereby representing a profound improvement over the precision achieved with components of similar tolerances in the prior art.

It will be appreciated that the above descriptions are intended only to serve as examples, and that many other embodiments are possible within the spirit and the scope of the present invention. For example, while the present invention has been described in an embodiment particularly suited to calibration of existing rotary tables or platforms, it may readily be adapted for inclusion in a rotary platform assembly to be used as part of the control system.

What is claimed is:

1. A method for precise measurement of an angular position of a rotatable element relative to a base, the method comprising the steps of:
   (a) generating, through rotation of a disk having at least one graduated track:
      (i) an oscillating reference signal, and
      (ii) an oscillating measurement signal, said measurement signal being related to said reference signal by a phase shift, said phase shift being a function of the angular position of the rotatable element relative to the base; and
   (b) measuring said phase shift, wherein a variation of 2π in said phase shift corresponds to a rotation step of less than about 1° of the rotatable element relative to the base.

2. The method of claim 1, wherein said phase shift is measured in the range 0–2π thereby indicating the angular position within a rotation step, the method further comprising the step of counting zero crossings of said phase shift from a given starting value, said starting value corresponding to an initial angular position, such that the number of phase shift zero crossings indicates a rotation step within which the angular position lies.

3. The method of claim 2, further comprising the step of identifying the state of the rotatable element as either rotating or stationary.

4. The method of claim 1, wherein said phase shift is measured in the range 0–2π thereby indicating the angular position within a rotation step, the method further comprising the step of performing an approximate measurement of the angular position of the rotatable element relative to the base so as to determine a rotation step within which the angular position lies.

5. The method of claim 1, wherein said reference signal is generated by measuring optical transmission through a combination of a fixed grid of alternating lines of high and low transparency and said at least one track on said rotating disk.

6. The method of claim 1, wherein said measurement signal is generated by measuring optical transmission through a combination of a measuring track of alternating lines of high and low transparency associated with the element and said at least one track on said rotating disk.

7. A device for measuring a precise angular position of an element rotatable relative to a base, the device comprising:
   (a) a rotating disk having at least one primary track of alternating lines of high and low transparency, said at least one primary track providing a first track portion and a second track portion, said rotating disk being rotated continuously about the axis of rotation of the element;

(b) an optical grid of alternating lines of high and low transparency associated with one of the base and the element, said optical grid being positioned parallel to said rotating disk and opposite said first track portion;

(c) a measuring disk associated with the other of the base and the element, said measuring disk being aligned coaxially with said rotating disk, said measuring disk having a secondary track of alternating lines of high and low transparency, said secondary track being aligned opposite said second track portion;

(d) a first photoelectric sensor generating a reference signal indicative of variations in optical transmissivity through a combination of said first track portion and said optical grid;

(e) a second photoelectric sensor generating a measuring signal indicative of variations in optical transmissivity through a combination of said second track portion and said secondary track; and (f) a processor for processing said reference signal and said measuring signal to calculate information relating to the precise angular position of the element relative to the base, wherein said first track portion, said second track portion, said optical grid and said secondary track all have a substantially equal effective angular line spacing.

8. A device as in claim 7, wherein said processor includes:

(a) at least one timer for measuring:
  (i) a period of a cycle of said reference signal, and
  (ii) a corresponding phase delay between said reference signal and said measuring signal;

(b) a memory for storing a plurality of pairs of said period and said phase delay; and (c) a numerical processor for processing said plurality of pairs so as to calculate a precise representative phase difference.

9. A device as in claim 8, wherein said processor further includes a counter for counting zero crossings of phase difference between said reference signal and said measuring signal.

10. A device as in claim 7, further comprising a ball-and-socket joint associated with the base so as to accommodate a range of orientations of the rotatable element relative to the base.

11. A method for performing precise measurement of the angular position of an element rotatable relative to a base, the method comprising the steps of:

(a) generating a first signal in relation to relative movement between the base and a rotating member, said first signal being approximately periodic;

(b) generating a second signal in relation to relative movement between the element and said rotating member, said second signal being approximately periodic;

(c) deriving from said first and second signals a plurality of data pairs $(T_i, t_i)$, where $T_i$ is the period of a cycle of one of said first and second signals, and $t_i$ is the corresponding phase delay between said first and second signals;

(d) processing said plurality of data pairs to identify a precise representative phase difference between said first and second signals; and (e) calculating from said representative phase difference information relating to the precise angular position of the rotatable element relative to the base.

12. A method as in claim 11, wherein said first signal is generated by sensing light transmitted through a combination of a graduated scale associated with said base and a graduated track associated with said rotating member.

13. A method as in claim 11, wherein said second signal is generated by sensing light transmitted through a combination of a first graduated track associated with said element and a second graduated track associated with said rotating member.

14. A method as in claim 11, wherein said first and second signals include about 3600 cycles for each rotation of said rotating member.

15. A method as in claim 11, wherein said step of deriving a plurality of data pairs $(T_i, t_i)$ includes deriving said data pair for consecutive cycles of said first or second signal for N cycles, where N is equal to the number of cycles generated by each rotation of said rotating member.

* * * * *